(12) United States Patent
Dickey et al.

(10) Patent No.: US 7,621,091 B2
(45) Date of Patent: Nov. 24, 2009

(54) PORTABLE FLOOR

(75) Inventors: Christopher C. Dickey, West St. Paul, MN (US); Todd A. Schilling, Verona, WI (US)

(73) Assignee: Sico Incorporated, Edina, MN (US)

( * ) Notice: Subject to any disclaimer, the term of this patent is extended or adjusted under 35 U.S.C. 154(b) by 249 days.

(21) Appl. No.: 11/271,513

(22) Filed: Nov. 10, 2005

(65) Prior Publication Data

US 2007/0113492 A1 May 24, 2007

(51) Int. Cl.
*E04B 2/00* (2006.01)
*F16B 9/00* (2006.01)

(52) U.S. Cl. ............... 52/582.2; 52/586.1; 403/252

(58) Field of Classification Search ............... 52/584.1, 52/582.2, 592, 177, 263, 220.5, 582.1, 127.7, 52/127.11, 127.8, 127.9, 313, 586.1, 592.1, 52/36; 404/35, 36, 40; 403/253, 252, 257, 403/259; 312/265.5

See application file for complete search history.

(56) References Cited

U.S. PATENT DOCUMENTS

| | | | | |
|---|---|---|---|---|
| 2,340,864 | A | * | 2/1944 | Carpenter .................. 52/127.9 |
| 2,822,585 | A | * | 2/1958 | Baruch ...................... 52/582.1 |
| 2,885,039 | A | * | 5/1959 | Macfarland, Jr. ......... 52/127.11 |
| 3,567,260 | A | * | 3/1971 | Norris ..................... 52/127.11 |
| 3,587,199 | A | * | 6/1971 | Henry ....................... 52/582.2 |
| 4,020,613 | A | * | 5/1977 | Reynolds et al. ............ 403/321 |
| 4,340,929 | A | | 7/1982 | Konikoff et al. |
| 4,417,430 | A | * | 11/1983 | Loikitz ..................... 52/582.2 |
| 4,693,630 | A | * | 9/1987 | Giovannetti ................. 403/231 |
| 4,988,131 | A | | 1/1991 | Wilson et al. |
| 5,022,200 | A | | 6/1991 | Wilson et al. |
| 5,157,890 | A | * | 10/1992 | Jines ......................... 52/582.1 |
| 5,323,564 | A | * | 6/1994 | Mensching et al. ............. 52/7 |
| 5,433,053 | A | * | 7/1995 | Tulloch ..................... 52/582.1 |
| 5,616,389 | A | * | 4/1997 | Blatz ........................... 428/45 |
| 5,630,304 | A | * | 5/1997 | Austin ......................... 52/384 |
| 5,743,056 | A | * | 4/1998 | Balla-Goddard et al. . 52/309.11 |
| 5,918,437 | A | * | 7/1999 | Dobija .................... 52/506.01 |
| 5,953,878 | A | * | 9/1999 | Johnson .................... 52/582.2 |
| 6,032,427 | A | * | 3/2000 | Randjelovic ............... 52/584.1 |
| 6,119,427 | A | * | 9/2000 | Wyman et al. ............ 52/584.1 |
| 6,128,881 | A | | 10/2000 | Bue et al. |
| 6,189,283 | B1 | * | 2/2001 | Bentley et al. ............ 52/587.1 |
| 6,389,773 | B1 | * | 5/2002 | Reuter et al. .............. 52/582.2 |
| 6,460,306 | B1 | * | 10/2002 | Nelson ..................... 52/582.1 |
| 6,662,508 | B1 | * | 12/2003 | Else ........................... 52/177 |

(Continued)

FOREIGN PATENT DOCUMENTS

WO    WO 90/00656    1/1990

(Continued)

*Primary Examiner*—Robert J Canfield
*Assistant Examiner*—Brent W Herring
(74) *Attorney, Agent, or Firm*—Merchant & Gould P.C.

(57) ABSTRACT

A portable floor system having a plurality of floor panels configured for connection along abutting edges to form an extended floor surface. Each panel has a planar portion including a top surface, a core, and a bottom surface. Extruded edge portions include tongues along two edges and complementary tongues along the other two edges. Each edge also includes a panel connecting assembly along each edge, having a lock device extending from an edge into the core. The lock device mounts directly against an anchor element. The anchor element extends through the bottom surface and having a connector receiving portion.

11 Claims, 6 Drawing Sheets

U.S. PATENT DOCUMENTS

| | | | |
|---|---|---|---|
| 6,691,480 B2 * | 2/2004 | Garcia | 52/313 |
| 6,854,215 B1 * | 2/2005 | Kaiser | 49/506 |
| 7,137,229 B2 * | 11/2006 | Pervan | 52/313 |
| 7,516,587 B2 * | 4/2009 | Barlow | 52/591.2 |
| 7,543,417 B2 * | 6/2009 | McIntosh et al. | 52/589.1 |

FOREIGN PATENT DOCUMENTS

| | | |
|---|---|---|
| WO | WO 96/04441 | 2/1996 |
| WO | WO 97/21011 | 6/1997 |

* cited by examiner

PORTABLE FLOOR

BACKGROUND OF THE INVENTION

1. Field of the Invention

The present invention relates to a portable floor system and in particular to an improved locking assembly and mounting system for the locking assembly.

2. Description of the Prior Art

Portable floors generally have a number of interlocking, rectangular sections or panels and are used for providing an extended hard surface that may be set up over carpeting or other surfaces on a temporary basis, by joining the floor sections together in an edge-to-edge relationship. Locks or other connectors are provided along the edges of the panels to secure the adjacent panels together to form the extended floor surface.

Portable floors are used for a variety of purposes and are particularly useful in the hospitality and entertainment industry. It is often desired to provide a temporary smooth hard surface for dancing or other activities that can be removed so the space may be used for other activities. Floors are usually connected together in an edge-to-edge fashion with releasable locks along their edges. A portable floor of this general type is disclosed in U.S. Pat. No. 3,310,919, which discloses floor panels with each floor panel having an extruded tongue section along certain edges and a complementary extended groove section along certain other edges. The adjoining sections can be fitted together in an edge-to-edge relationship by a tongue and groove arrangement and held in place by threaded locking screws mounted above the grooves to engage notches in the tongue members. Although the portable floor disclosed in that patent has been successful in providing a convenient and efficient portable floor, further improvements are possible.

Another patent showing portable floors is U.S. Pat. No. 6,128,881. Cam-type rotary locks having complementary male and female members on the edge of the panels are used to engage and lock the panels together in proper alignment. Although the cam-type rotary locks are an improvement, there are challenges with mounting such locks. As weight is a concern in the portable floor panels, it is often desired to utilize a panel construction having a light weight core panel to reduce overall weight. Although using core materials such as foam, honeycomb or balsa wood aids in reducing weight, these materials are not suitable as a mounting structure. Prior methods of mounting the rotary locks to the floor panel with a core that provides little support is difficult. Moreover, such systems are difficult to replace when failure occurs. Typically, a portion of the core is removed and a wood block is inserted for mounting by joint connector nuts and bolts or mounting using standard wood screws. Such a system requires a precise alignment for a joint connector bolt inserting into a complementary joint connector nut having a complementary orifice. Great precision is required for aligning the nuts and bolts. Moreover, such systems using either wood screws or joint connector require drilling of a pilot hole. Improper positioning of such pilot holes may ruin the panel during the manufacturing process.

In addition, such systems are difficult to repair should failure occur. Although the rotary locks are generally held by at least two screws or joint connector bolts, they typically have four mounting holes. However, due to the proximity between the holes, if failure occurs, the adjacent hole is typically too close to the position of the failure to allow for repair and mounting of a separate joint connector nut and bolt.

A further problem is the precise alignment that is required and the special manufacturing methods needed to align all of the various elements. The anchoring block and the rotary lock member are also spaced apart with light weight core material or alternate fill material between the elements when mounted so that when force is applied, the material between the wood block and the lock member can collapse, which can lead to failure and/or misalignment.

Another problem with portable floors is alignment of wood grain surfaces to provide continuity. Due to imprecise manufacturing, floors that have aligned wood grains have been difficult to achieve. It can be appreciated that a method that provides for properly aligning and orienting the wood grain so that the pattern on the top surface is consistently placed so that each panel has an identical appearance and aligns with any other panel improves overall appearance of the floor system.

It can be seen that a new portable floor system using new and improved portable floor panels is needed that overcomes the problems related to locking assemblies and their mounting. Such a system should provide for simple and easy insertion and manufacture of the floor panel and the locking devices. Such a system should also eliminate soft core material between the locking member and the anchoring element. Such a system should also improve alignment and provide a light weight anchor that is easily replaced should failure occur. The present invention addresses these, as well as other problems associated with portable floor systems.

SUMMARY OF THE INVENTION

The present invention is directed to a portable floor system and in particular to a floor system wherein the individual floor panels have an improved mounting assembly for mounting the arrangement for the locking assemblies.

The portable floor system of the present invention provides a temporary floor surface that is suitable for dancing or other activities while providing multi-use capability for the space where the floor is removed. The present invention provides a portable floor having substantially rectangular floor panels connecting and locking along their edges to form a continuous extended floor surface. Along the edges of the floor are edge trim panels that provide a transition from the portable floor surface to the underlying surface.

Each of the floor panels includes a planar floor portion with an extruded edge section. These edges form complementary tongues and grooves for aligning the panels together. The panels are locked together by a cam-type rotary lock having complementary male and female members on the edges of adjacent panels. As the cam locks engage, the camming action tends to slide the panels relative to one another along the edges, thereby locking the panels together and ensuring a proper fit with no gaps between the panels. The present invention provides for a lightweight and easy to manufacture mounting arrangement for the locking assemblies. The lock members attach directly to an anchor element mounted into a slot formed in the floor panel. The anchor element is a light weight plastic element having holes receiving mounting screws that attach through the locking member directly to the anchor element. The direct mounting eliminates the need for making precise pilot holes as was needed with the prior art lock mounting systems. In addition, the direct abutment of the locking devices to the anchor element provides a stronger rigid mount that eliminates the sagging and compression that may occur if the soft core material between the lock and the mounting blocks of the prior art has pressure applied.

In addition to a sturdier mounting arrangement, the mounting system of the present invention is also easy to manufacture. A first slot for the anchor element is formed in the bottom of the panel and a second slot for receiving the lock is formed in the edge of the panel to intersect the first slot and form a continuous opening. This provides for mounting the lock member directly against the anchor element for additional support. Moreover, the pattern on the upper surface may be continuous panel to panel and the lock and anchoring elements are aligned off a particular indexing feature of the surface panels so that the various panels are precisely aligned and therefore, can form a continuous wood grain pattern from panel to panel over the entire floor.

The mounting arrangement also provides for easy replacement as damaged screws may simply be replaced by removing the anchor element and the lock and replacing the damaged pieces. It can also be appreciated that if a mounting screw or hole is stripped, an adjacent hole may be utilized for mounting, thus eliminating the need for replacement of the anchor element. Moreover, the present invention does not require any type of adhesive or special steps for mounting. The anchor element is a rigid light weight plastic material such as nylon, with much of the slot into which it inserts remaining empty so that the mounting system achieves weight savings over the prior art systems.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

DETAILED DESCRIPTION OF THE PREFERRED EMBODIMENT

Figure 1:
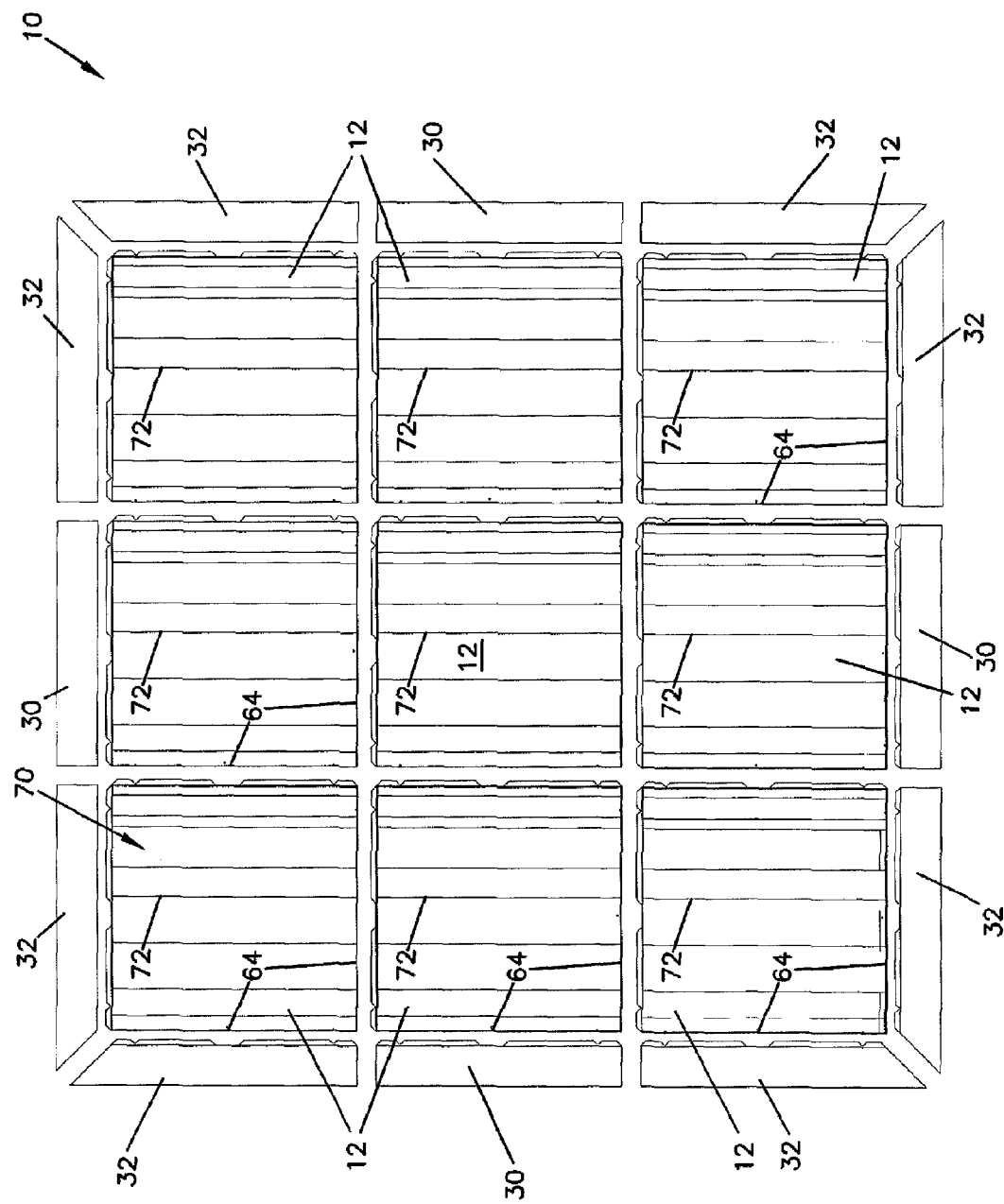
FIG. 1 is a top plan view of a portable floor system according to the principles of the present invention.

Referring now to the drawings, and in particular to FIG. 1, there is shown a portable floor system, generally designated 10. The floor system 10 includes a plurality of generally rectangular floor panels 12 joined in an edge-to-edge relationship to form an extended, continuous floor surface. Such panels generally include a lightweight planar portion 14 with an extruded edge elements including tongues 16 along two edges and grooves 18 along the other two edges. With this arrangement, the tongues 16 insert to the corresponding grooves 18 and provide engagement of the edges of adjacent panels.

Figure 5:
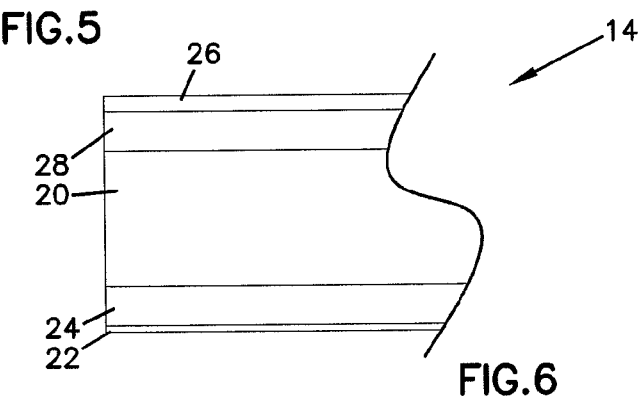
FIG. 5 is a side sectional view of a portion of the panel shown in FIG. 2.

Referring now to FIG. 5, the planar portion 14 typically includes a light weight center core layer 20, a hard bottom exterior layer 22 and a bottom inner support layer 24. A top support layer 28 extends over the core layer 20 and a top exterior layer 26 covers the top support layer 28. The top exterior layer 26 may have a pattern and in one embodiment, includes a wood grain pattern to give the impression of a hardwood floor. It can be appreciated that fewer or more layers may be utilized, depending upon the use, but should include a lightweight core layer 20. Referring again to FIG. 1, the wood grain layer 70 is a continuous repeating pattern and includes a designated indexing feature 72 that it utilized for positioning the necessary cuts and for positioning the edges of the panel and the so that the pattern is continuous from one panel 12 to the next.

Referring again to FIG. 1, the floor system 10 also includes edge trim pieces 30 and 32. The edge trim pieces 30 and 32 form a safe transition from the upper surface of the floor system 10 to the underlying ground or floor. The edge trim pieces 30 and 32 have either tongues or grooves (not shown) similar to the tongues and grooves of the extruded edge 16 and 18 and mate in a similar manner. As explained hereinafter, the edge trim pieces 30 and 32 have corresponding locking devices that also engage complementary locking devices of the floor system 10.

Figure 2:
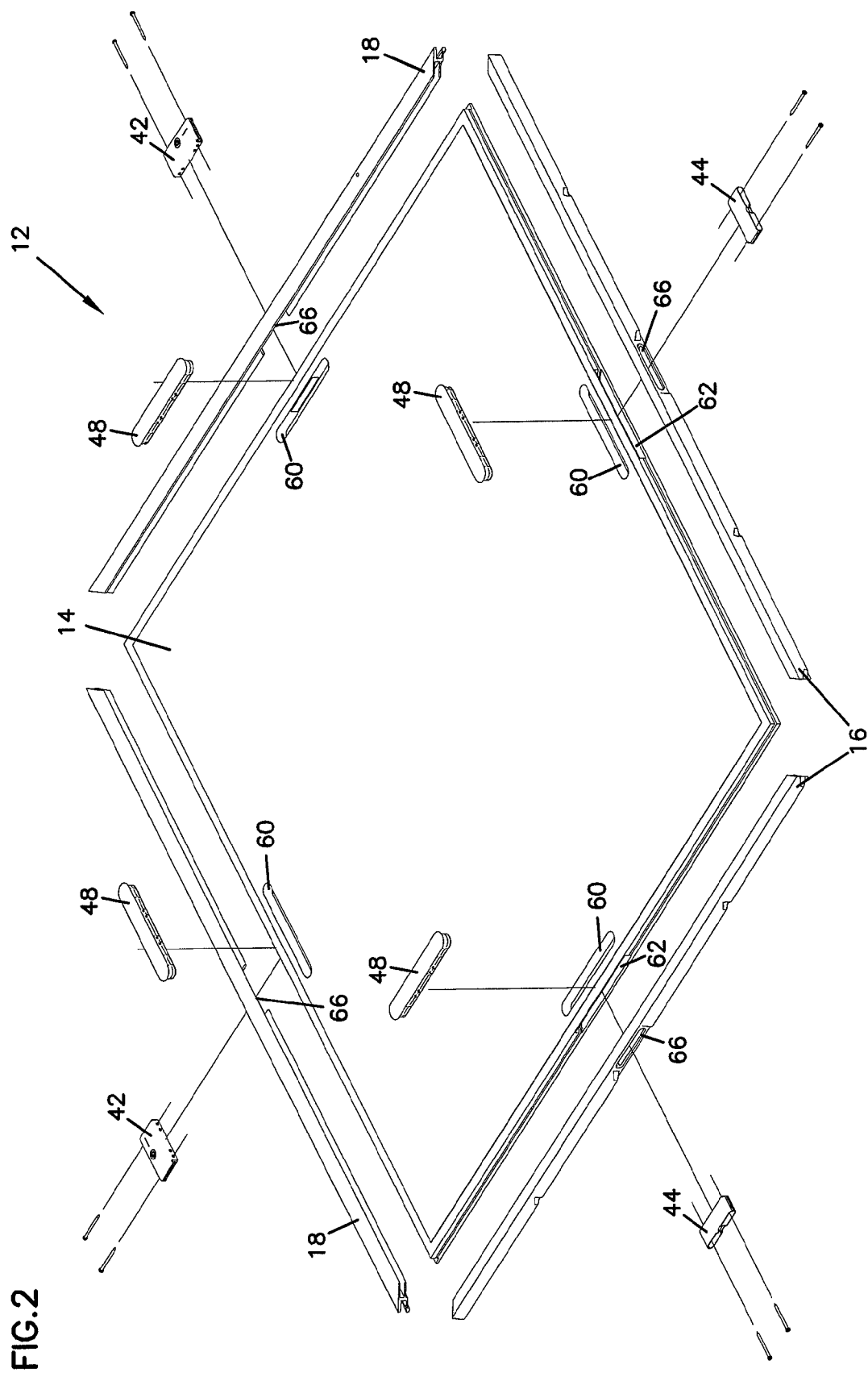
FIG. 2 is a bottom exploded perspective view of a floor panel for the portable floor system shown in FIG. 1.
Figure 3:
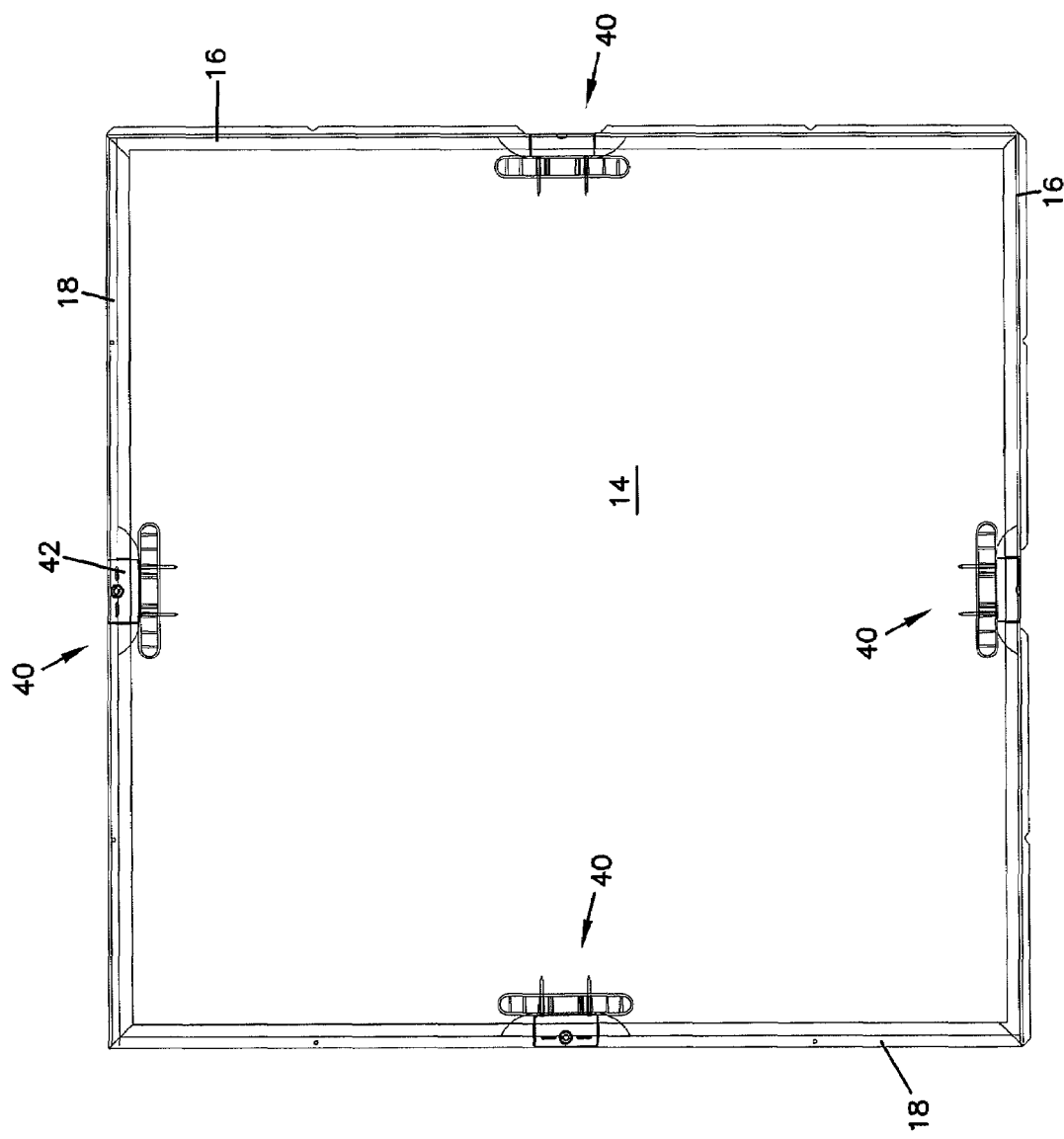
FIG. 3 is a top view of the floor panel shown in FIG. 2 with portions removed to show the locking assembly.
Figure 4:
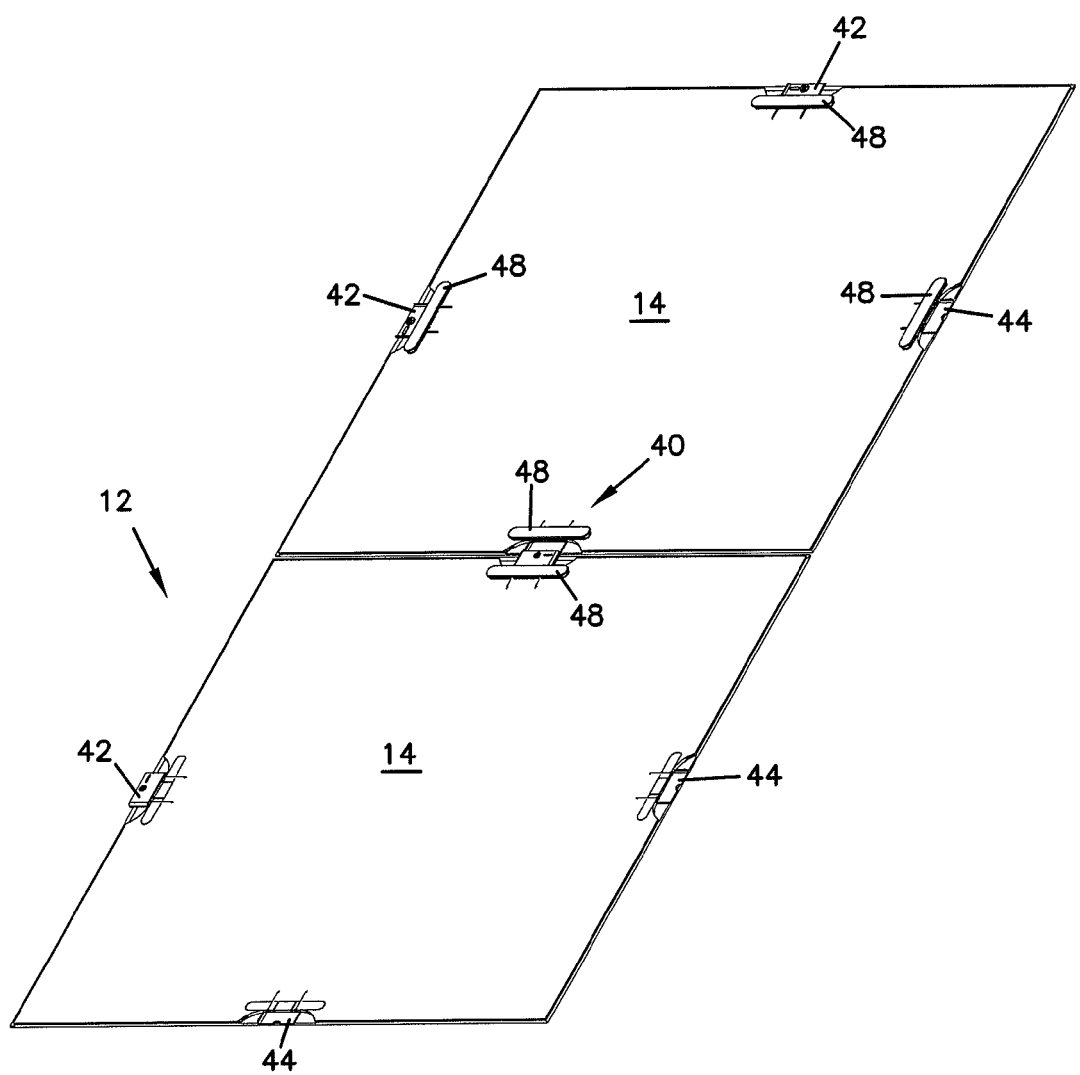
FIG. 4 is a bottom perspective view with portions removed of two panels for the floor system shown in FIG. 1 joined together.

Referring now to FIGS. 2, 3 and 4, the floor panels 12 are shown with the planar portions 14 and the extruded edge members including tongues 16 and grooves 18. The tongues 16 are along two adjacent sides while the grooves 18 are along the two adjacent opposite sides. The tongues 16 engage the complementary grooves 18 of adjacent panels 12 so that the edges of the floor panels 12 abut and the floor panels 12 form an extended continuous floor surface.

Figure 7:
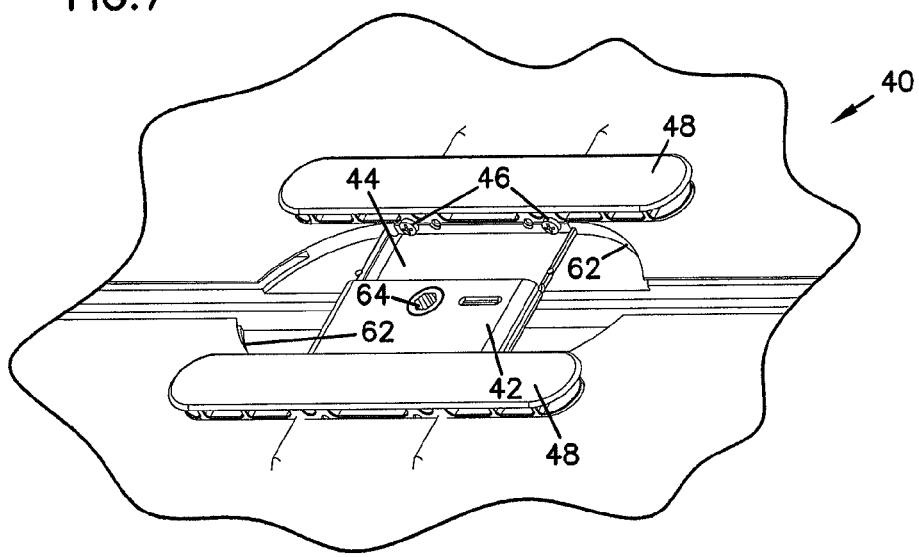
FIG. 7 is a bottom perspective view of two locking assemblies shown in FIG. 6 and their mounting to the panels with the locking assemblies connected.

The floor panels 12 are connected to one another with lock assemblies 40, as shown more clearly in FIG. 7. Referring again to FIGS. 2-4, the lock assemblies include female locks 42 and complementary male locks 44. The complementary rotary locks 42 and 44 provide for pulling the edges together to ensure a tight fit. The female rotating cam lock devices 42 have a rotatable circular cam and mount at the center of the two edges having grooves 18. The complementary male cam lock members 44 mount at the center of the edges having tongues 16 and receive and retain the rotary cam member when the lock is actuated and the cam member extends into the male lock member 44. The female cam members 42 are actuated by rotating the cam with an Allen-type tool inserted into an orifice 64 in the upper surface of the floor panels 12. When actuated, the cam pulls the cam lock devices 42 and 44 and therefore the floor panels 12 together to ensure that no gaps are formed in the floor 10 and a tight edge-to-edge connection is maintained between adjacent panels 12.

Figure 6:
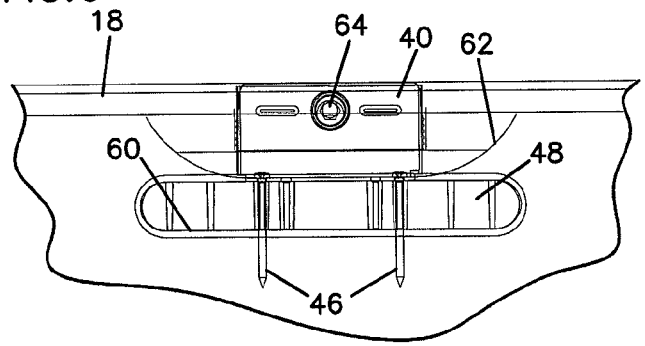
FIG. 6 is top detail view of the floor panel shown in FIG. 2 showing the locking assembly.
Figure 8:
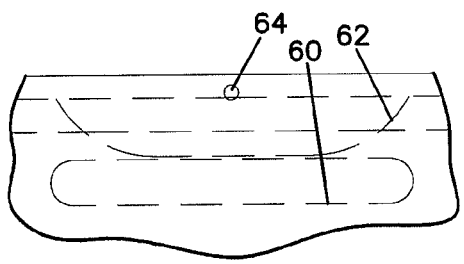
FIG. 8 is a top plan view of a portion of the panel shown in FIG. 2 showing slots for installation of the locking assembly.
Figure 9:
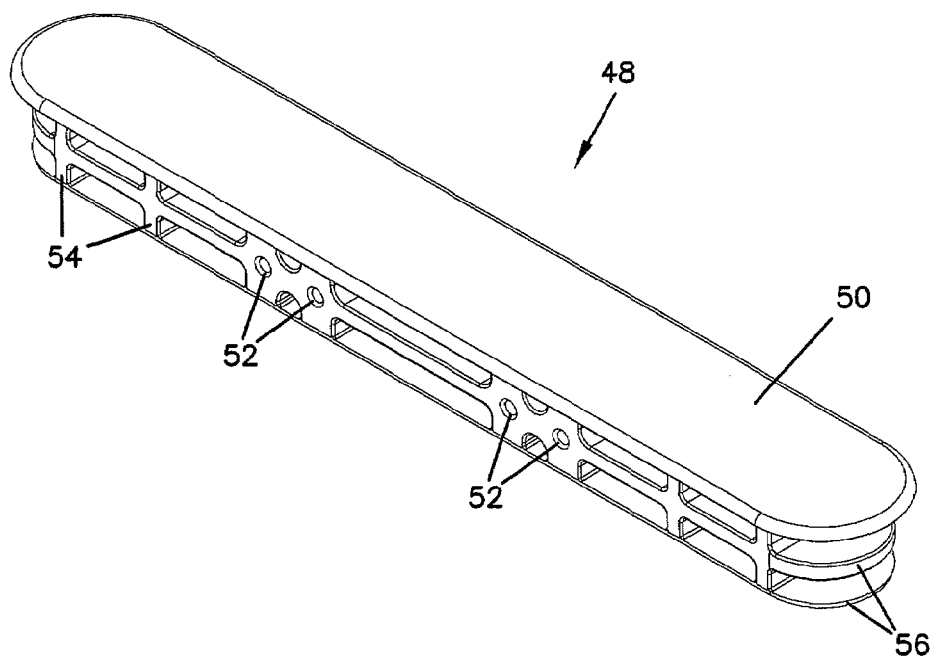
FIG. 9 is a perspective view of the anchor element for the locking assembly shown in FIG. 6.
Figure 10:
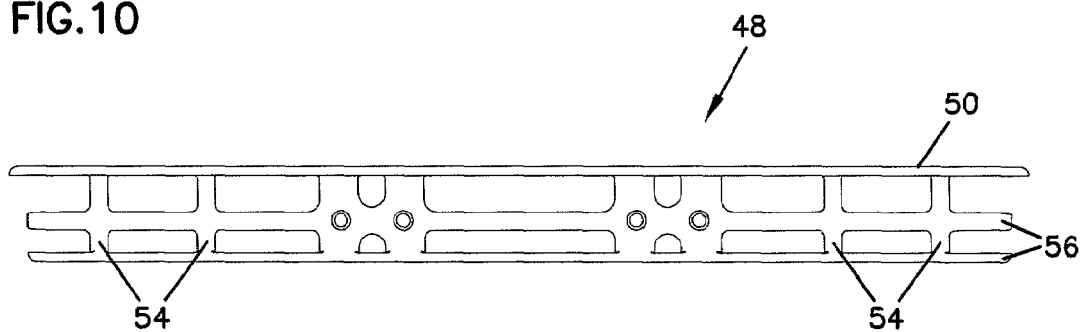
FIG. 10 is a side elevational view of an anchor element shown in FIG. 9.

Referring now to FIGS. 5-7, the improved mounting arrangement of the lock assemblies 40 of the present invention is shown. The lock assemblies 40 include the bodies of the female and male lock members 42 and 44 that mount directly into slots 66 formed through the tongues 16 and grooves 18 of the edges and slots 62 formed in the planar panel portion 14. The female lock devices 42 and the male lock devices 44 mount directly to an anchoring element 48. The slots 62 are formed in the edges of the center core of the planar portion 14. The anchoring element fits into a slot 60, shown most clearly in FIGS. 2 and 8. Mounting screws 46 extend through the back of the female and male locks 42 and 44 and into receiving portions 52 of the anchoring element 48, shown most clearly in FIG. 9. It can be appreciated that with this arrangement, the lock devices 42 and 44 mount directly to the anchoring element 48 and abut the anchoring element, thereby eliminating the less dense and poorly supporting material of the lightweight center layer 20 of the prior art. The anchoring element 48 provides added support for the lock members 42 and 44. Moreover, installation is straight forward and requires no special tools or application of adhesive.

Should damage occur, repair is simple so that the panel 12 is not ruined. If a mounting screw 46 or orifice 52 is stripped, a new screw may simply be inserted into the adjacent unused receiving orifice 52 and no replacement parts are needed. It can be appreciated that if the anchoring element 48 or other elements do need to replacement, they are simply removed with a screwdriver and new lock devices 42 or 44 or anchoring elements 48 may be remounted without any adverse effect to the floor panel 12.

The anchoring element 48 provides further advantages over the prior art wood mounting blocks. The anchoring elements 48 are preferably made of a sturdy but light weight plastic material such as nylon 6/6 or other suitable material well known in the art. The plastic material includes an upper flange 50 that extends slightly around the slot 60 and over a portion of the bottom of the floor panel 12. Horizontal ribs 56 and vertical ribs 54 provide a sturdy support structure for the mounting portions 52. As the anchoring element 48 provides much empty space, it provides weight savings over solid wood block mounting systems.

Forming of the slots 62 and 60 is accomplished quite simply with a router and is positioned to ensure a proper placement from an indexing feature 72 of the surface pattern 70. The edges of planar portion 14 are formed at the same time as the slots 60 and 62 so that the slots 60 and 62 are precisely located to ensure proper alignment of the lock devices 42 and 44. This also provides sufficiently precise alignment to ensure that the patterns that are configured for being continuous are consistently aligned and oriented to give an improved overall continuous natural wood grain or other floor appearance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable floor panel, comprising:
    a planar portion including a top surface, a core, and a bottom surface, complementary edge portions;
    a panel locking assembly along each edge, the locking assembly having a lock device extending from an edge into the core, connectors, and an anchor element abutting the lock device, the anchor element extending through the bottom surface and having an uppermost portion flush or below the top surface, the anchor element a defining a first connector receiving portion and a second connector receiving portion spaced apart from the first connector portion, each connector receiving portion defining at least two orifices, wherein the connectors engage the lock device and the anchor element to attach the anchor element to the lock device.

2. A floor panel according to claim 1, wherein the anchor element defines voids within the anchor element when inserted in the planar portion.

3. A floor panel according to claim 1, wherein the panel comprises an extruded edge member and wherein the edge member defines an orifice receiving the lock device.

4. A floor panel according to claim 1, wherein the top surface of the panel has a natural wood grain appearance and wherein the wood grain appearance of the top surface defines an indexing spot for aligning the locking device.

5. A floor panel according to claim 1, wherein the anchor element includes a flange with a portion extending over a portion of the bottom surface.

6. A floor panel according to claim 1, wherein the planar portion defines a slot formed through the bottom surface and the core for receiving the anchor element.

7. A floor panel according to claim 6, wherein the panel comprises an extruded edge member and wherein the edge member defines an orifice receiving the lock device.

8. A floor panel according to claim 6, wherein the planar portion defines a recess formed in a side thereof receiving the lock device.

9. A floor panel according to claim 8, wherein the panel comprises an extruded edge member and wherein the edge member defines an orifice aligned with the orifice formed in the side of the planar portion and receiving the lock device.

10. A floor panel according to claim 1, wherein the anchor element comprises nylon.

11. A portable floor panel, comprising:
    a planar portion including a top surface, a core, and a bottom surface,
    complementary edge portions;
    a panel locking assembly along each edge, the locking assembly having a lock device extending from an edge into the core, connectors, and an anchor element abutting the lock device and embedded in a recess in the panel and comprises integral intersecting vertical and horizontal ribs, the anchor element extending through the bottom surface and having an uppermost portion flush or below the top surface, the anchor element having a connector receiving portion, wherein the connectors engage the lock device and the anchor element to attach the anchor element to the lock device.

* * * * *